Sept. 11, 1945.　　　　W. F. ALLER　　　　2,384,519
GAUGING DEVICE
Filed April 26, 1943　　　　2 Sheets-Sheet 1

INVENTOR.
W. F. Aller
BY Edward J. Noe Jr.
ATTORNEY.

Sept. 11, 1945.  W. F. ALLER  2,384,519
GAUGING DEVICE
Filed April 26, 1943  2 Sheets-Sheet 2

INVENTOR.
W. F. Aller
BY Edward T. Noeij
ATTORNEY.

Patented Sept. 11, 1945

2,384,519

UNITED STATES PATENT OFFICE 2,384,519

GAUGING DEVICE

Willis Fay Aller, Dayton, Ohio, assignor to The Sheffield Corporation, Dayton, Ohio, a corporation of Ohio Application April 26, 1943, Serial No. 484,529

12 Claims. (Cl. 33—172)

This invention relates to gauging or measuring instruments.

One object of the invention is the provision of a gauging apparatus that may be used in comparing or gauging a measured part with respect to a standard part or dimension, and incorporating a member operable by the work or part to be measured, the apparatus being of small and compact construction and reliable and accurate in operation.

Another object is the provision of a gauging apparatus including stationary and movable members, interconnected by parallel spring blades, the members having end blocks interconnected by a pair of parallel thin metal strips which serve to partially enclose or house electrical switch means operated by the movable member.

Another object is the provision of a gauging apparatus having a housing or casing, one end of which is closed by a support that carries a stationary member interconnected to a movable member by a pair of parallel spring blades, with switch means and a switch operating arm that is moved or positioned in accordance with the position of the movable member arranged within the confines of the stationary and movable member.

Another object is the provision of a gauging apparatus including stationary and movable members having end blocks interconnected by spaced parallel thin rigid strips which serve to partially house or enclose a pair of switches controlled by an operating arm that is moved by the movable member, with a pair of adjusting devices arranged adjacent one another at one end of the gauging apparatus and operable through the space provided between the parallel connecting strips of the movable member.

Still other objects and advantages of the invention will be apparent from the following description, the appended claims and the accompanying drawings, in which, Fig. 1 is an enlarged view of a gauging apparatus embodying the present invention, some of the parts being shown broken away or in vertical section;

Figure 1:
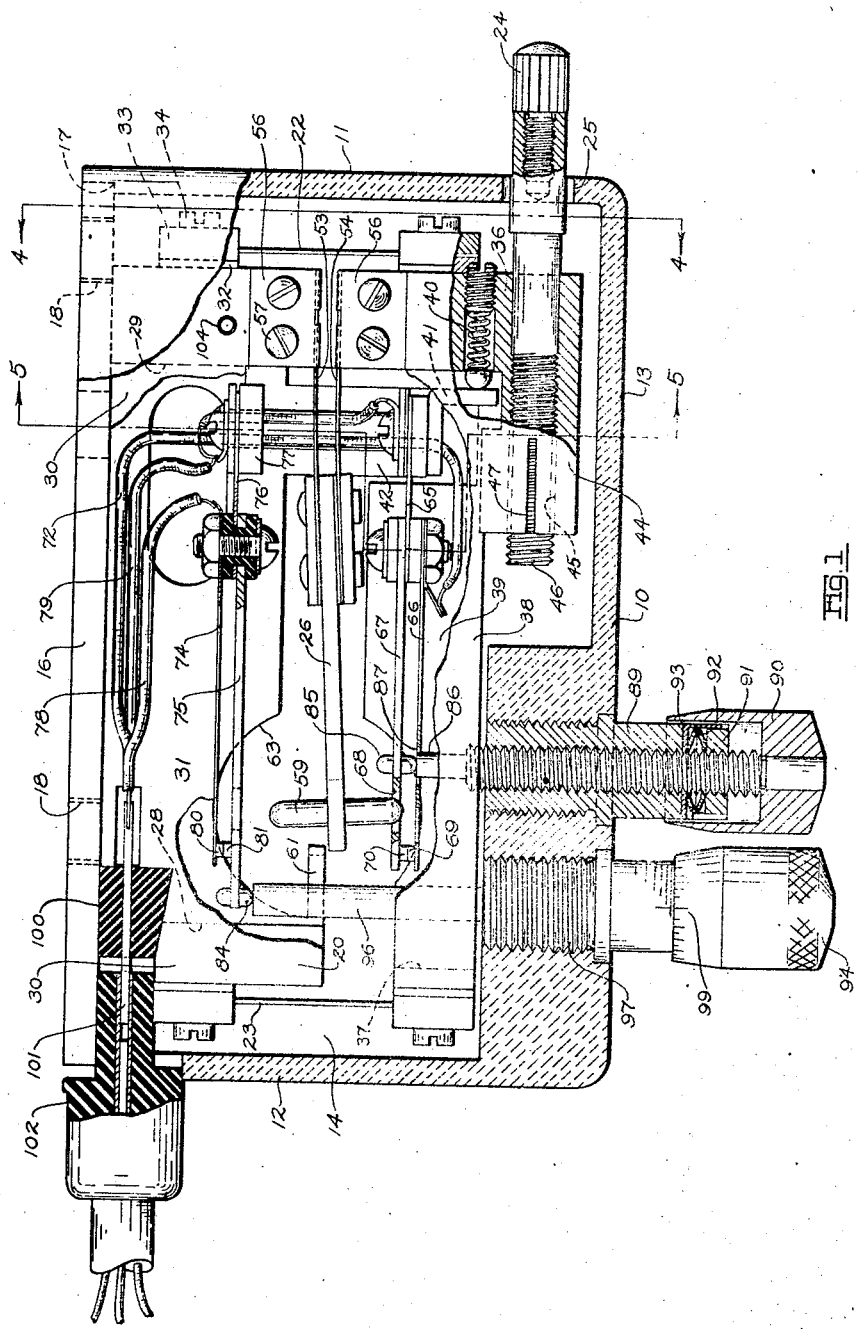

Referring more particularly to the drawings, in which a preferred form of the invention has been shown as a switch controlling gauging apparatus for opening and closing electric circuits in accordance with the positioning of a movable work operated element, 10 generally designates a housing or casing made of suitable insulating material and preferably molded in one piece to provide a substantially rectangular and rather narrow shell in which the major parts of the gauging apparatus are enclosed or housed. The casing comprises end walls 11, 12 and 13 and side walls 14 and 15, leaving one end open for the reception of the operating parts. This open end is closed by a support 16, preferably in the form of a metal plate that fits into the recess 17 and having a plurality of threaded attaching holes 18 by means of which the support can be held on a standard or carrier, in a desired position.

Carried by the support 16, and preferably brazed or integrally attached to it, is a stationary member generally designated 20 which is connected to a movable member 21 by means of a pair of parallel spring blades 22 and 23, the arrangement being such that the movable member 21 is supported in a yielding manner to move towards the right and left as viewed in Fig. 1. The movable member 21 carries a work operated element 24 which projects through a clearance opening 25 in the casing. Where the gauging apparatus is used for comparing or measuring the size of a workpiece, the workpiece is arranged for contact with the element 24, support 16 being held on a standard or carrier, and the element 24 will be moved to the left, as viewed in Fig. 1, by the workpiece to an extent determined by the size of the workpiece, the position of the movable member 21 determining the position of a pointer or arm 26 which is carried jointly by the stationary and movable members 20 and 21. The arm 26 serves to operate electric switches arranged in the casing, as will be more fully described.

The stationary and movable members 20 and 21 are of generally similar construction, each comprising metal end blocks interconnected by spaced parallel metal strips, preferably of sheet metal, which overlap the sides of the end blocks. The member 20 comprises end block 28 and an end block 29 which are considerably spaced apart and which are interconnected by sheet metal side plates 30 and 31 which are preferably pinned or brazed to the end blocks. These plates and the end block 29 are brazed to the support 16. On the end block 29 is a shouldered portion 32 forming a seat for one end of the spring blade 22 which is clamped between this seat and a holding cap 33. Screw 34 holds the cap tightly in place. In a similar manner, one end of the spring blade 23 is secured to the end block 28.

The movable member 21 comprises end blocks 36 and 37 integrally connected to a pair of spaced sheet metal side plates or strips 38 and 39, block 36 being secured to an end of the spring strip 22 while an end of the other spring strip 23 is secured to the end block 37. The movable member 21 is arranged adjacent the stationary member 20 and in line with it, so that it can move in a direction parallel to the length of the support 16, in a yielding manner and in limited amount. Normally, with no pressure applied to the work operated element 24, the spring blades 22 and 23 are somewhat flexed, and the element 24 is projected, because a spring 40 arranged in a bore in the movable block 36 presses against an ear 41 bent up from an extension 42 of the sheet metal strip 31. The end block 36 of the movable member is preferably substantially L shaped, as shown in Fig. 1, having an extended portion 44 provided with internal threads 45 which receive the threaded stem 46 of the work operated element. The extent to which the work operated element projects from the casing may be adjusted by turning it in the block 36. The extended portion 44 of this end block is slotted, as shown at 47, with the slots extending parallel to the axis of the threaded stem, and the threaded slotted portions of the block are squeezed or pressed together, before the stem is applied to it, to such an extent as to hold the stem firmly enough against turning but permitting an intentional adjustment of the stem.

Figure 3:
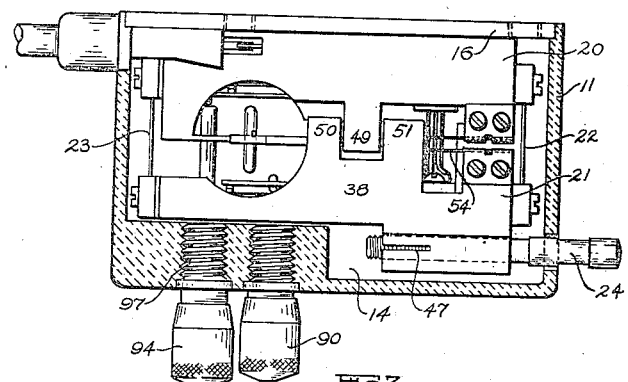
Fig. 3 is a view corresponding to Fig. 2 but showing the casing in section.
Figure 2:
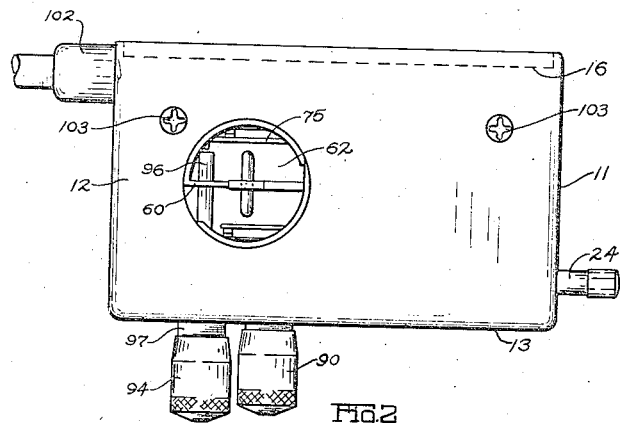
Fig. 2 is a side elevation of the gauging apparatus.
Figure 4:
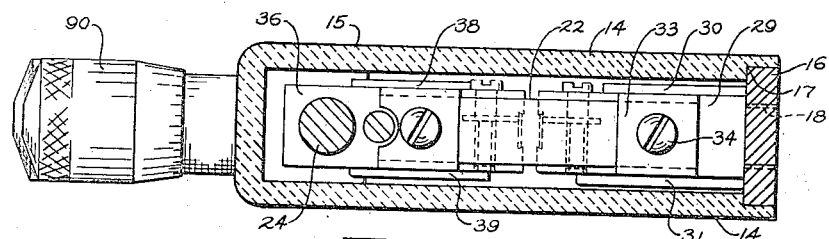
Fig. 4 is a section on the line 4—4 of Fig. 1.

The side plates 30 and 38 of the stationary and movable members 20 and 21, as shown in Fig. 3, have interfitting portions permitting some relative axial movement of the movable member but restraining it against excessive movement. Thus the plate 30 has a tongue 49 lying in the same plane that contains the tongue portions 50 and 51 of plate 38, with suitable space between the tongue 49 and the tongues on the plate 38. Normally the spring 40 holds the plate 38 towards the right as viewed in Fig. 3 and maintains the tongue 49 in engagement with the tongue 50.

Figure 5:
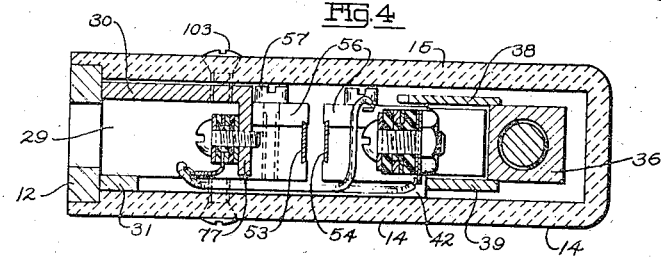
Fig. 5 is a section on the line 5—5 of Fig. 1.

Closely adjacent portions of the stationary and movable members 20 and 21 are secured to the ends of parallel spring strips or reeds 53 and 54, see Figs. 1 and 5. The secured portions of these reeds are of dovetail form, and cap plates 56 held by screws 57 and provided with angular recesses that receive the sides of the reeds serve to hold the reeds in position on the end blocks 29 and 36. The free ends of the spring reeds 53 and 54 are secured firmly together and to the arm 26 which is made of insulating material. Near the end of the arm 26 is an insulating pin 59, the end portion of arm 26 extending past the pin 59 and registering in line with tongues 60 and 61, forming extensions of the side plates 30 and 31, when the arm 26 is in a central position corresponding to an intermediate position of the movable member, when the spring blades 22 and 23 are straight. As shown in Fig. 1, the spring blades are slightly flexed and the arm 26 is moved slightly from its centered position. The relative position of the arm 26 with respect to the tongues 60 and 61 is visible through transparent windows 62 in the sides 14 and 15 of the casing, the side plates of the stationary and movable members being cut back, as indicated at 63, so that a portion of the arm 26 and the pin 59 will be visible.

The stationary member 20 carries switch means operated by the arm 26. As shown, the extension 42 of plate 31 has a short leaf spring 65 secured to it, the spring serving as a support for a flexible switch blade 66 and a rigid switch blade 67 which has an opening 68 through which the pin 59 of the operating arm can pass to contact with the flexible blade 66. The two blades 65 and 66 carry electrical contact points 69 and 70 which normally engage to connect the blades 66 and 67 electrically.

The stationary member 20 also supports a flexible switch blade 74 and a rigid switch blade 75 by means of the short leaf spring 76 arranged on an ear 77 bent down from the plate 30. The switch blade 74 is connected electrically to a wire 78, and a wire 79 connects through the leaf springs 76 and 65 to the two rigid switch blades 75 and 67. A wire 72 connects to the switch blade 66. The contact points 80 and 81 on the switch blades 74 and 75 are separated when the pin 59 pushes outwardly on the strip 74 and forces it away from the blade 75. The leaf springs 76 and 65 serve to normally hold the rigid switch blades 75 and 67 downwardly as viewed in Fig. 1, but in a yielding manner.

The positions of the switch blades 75 and 67 are individually controlled or adjusted from one end of the casing, by means of adjusting screws or studs which project through the space between the side plates of the movable member 21 and contact with insulating buttons 84 and 85 on these strips. The adjustment for the switch blade 67 comprises a threaded stud 86 which extends freely through a hole 87 in the switch blade 66 and contacts with the insulating button 85. The stud 86 is threaded in a metal insert 89 which is threaded in the casing. The outer end of the stud 86 is secured to the adjusting knob 90. A nut 91 threaded on the stud 86 and secured against rotation by a ring 93 fixed on insert 89 holds a spring disc or washer 92 under suitable tension to yieldingly hold the stud in any adjusted position.

Arranged adjacent the knob 90 is the second knob 94, secured to the stud 96. The stud 96 is threaded in the insert 97 and projects beyond the end of the switch blades 66 and 67 and between the side plates of the fixed and movable members 20 and 21 into contact with the insulating button 84 on the end of blade 75. The pitch of the screw threads of the stud 96 is proportionately larger than the thread pitch of the stud 86 so that one turn of the knob 94 will give the same amount of movement to the switch contact 81 that is given to switch contact 70 by one turn of the knob 90, although the axis of the adjusting stud 96 is farther from the fulcrum point of the blade 75 than the distance between the stud 86 and the fulcrum of the switch blade 67. Suitable graduations are preferably provided on the adjusting knobs, as indicated at 99. By adjusting the knobs 90 and 84 the distance the arm 26 moves from a central position before it opens either one of the two switches can be independently adjusted, thus providing a convenient means for varying the tolerance permitted in any gauging operation. As the two adjustment knobs are located adjacent one another at one end of the casing they may both be placed in a readily accessible and convenient location. The wires connected to the switch means may extend to suitable indicating lamps or the like to provide a visible indication showing whether or not the part checked or measured is of a desired size within required tolerance limits or is oversize or undersize as the case may be. Wires 78, 79 and 72 lead to a connector plug or socket 100 of insulating material fixed on the support 16 between the support and the plates 30 and 31 of the stationary member. The connecting studs 101 which project from the connector 100 are adapted to be electrically connected to the connection plug 102, forming a socket that can be readily attached to or disconnected from the gauging device.

The casing is applied to the support 16 and the stationary and movable parts carried thereby before connecting the work operated element 24 to the movable member 21. After slipping the casing onto the support over the stationary and movable members, it is connected by attaching screws 103 which thread into tapped holes 104 in the end blocks of the stationary member. The work operated element 24 is then screwed in place. The casing carries the adjusting devices for the switch means with it.

As will now be apparent, the moving parts of the mechanism are comparatively light in weight and of small size and the casing need be only slightly larger than the spaces defined by the stationary and movable members 20 and 21. The operating parts, namely the movable arm 26 and the switch means are all protected and partially housed within the stationary and movable members 20 and 21. The skeleton form which is given to the stationary and movable members 20 and 21 affords a chamber for movable parts of the switch means and also permits the switch adjusting stud 96 to extend through the movable member 21. Thus the two adjusting knobs 90 and 94 may be very conveniently arranged alongside of one another at one end of the casing. While the spring supports for the various moving members assures a very long life without wear and without looseness or play, the various moving parts of the device can be readily disassembled for repair in replacement if that should become necessary.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a support, a stationary member fixed to said support, a movable member arranged adjacent said stationary member, said members each comprising a pair of spaced end blocks and a pair of parallel spaced metal strips interconnecting said blocks, a pair of parallel spring strips secured to said members and supporting the movable member for reciprocatory movement on the stationary member, means on said movable member adapted for operation by a workpiece, a pair of parallel spring reeds one connected to an end block of the stationary member and the other connected to an end block of the movable member, and means secured to both of said spring reeds and operated thereby and arranged within the space defined by the metal strips of said members.

2. Gauging apparatus comprising a support, a stationary member fixed to said support, a movable member arranged adjacent said stationary member, said members each comprising a pair of spaced end blocks and a pair of parallel spaced metal strips interconnecting said blocks, a pair of parallel spring strips secured to said members and supporting the movable member for reciprocatory movement on the stationary member, means on said movable member adapted for operation by a workpiece, a pair of parallel spring reeds one connected to an end block of the stationary member and the other connected to an end block of the movable member, an arm secured to both of said spring reeds and operated thereby, and switch means operated by said arm and arranged in the space between the said spaced metal strips of the stationary and movable members.

3. Gauging apparatus comprising a support, a stationary member fixed to said support, a movable member arranged adjacent said stationary member, said members each comprising a pair of spaced end blocks and spaced sheet metal strips integrally connected to said blocks, a pair of parallel spring strips secured to said blocks and supporting the movable member for reciprocatory movement on the stationary member, means on said movable member adapted for operation by a work-piece, a pair of parallel spring reeds one connected to an end block of the stationary member and the other connected to the end block of the movable member, an arm secured to both of said spring reeds and operated thereby, and a pair of switches operated by said arm and arranged on opposite sides of the arm in the space between the sheet metal strips of the movable and stationary members.

4. Gauging apparatus comprising a casing having one open end, a support closing the open end of said casing, a stationary member fixed to said support and arranged in said casing, a movable member in said casing, said members each comprising a pair of spaced end blocks and a pair of parallel spaced metal strips interconnecting said blocks, a pair of parallel spring strips secured to said blocks and supporting the movable member for reciprocatory movement on the stationary member, means on said movable member projecting through an end wall of the casing and adapted for operation by a work-piece, a pair of parallel spring reeds one connected to an end block of the stationary member and the other connected to the end block of the movable member, an arm secured to both of said spring reeds and operated thereby, and switch means operated by said arm and arranged in the space between the sheet metal strips of the stationary and movable members.

5. Gauging apparatus comprising a substantially rectangular shallow casing having side walls and three end walls and with one open end of small area compared with the side walls, a support closing the open end of said casing and having means adapted for connection to a supporting mount, a stationary member fixed to said support and arranged in said casing, attaching screws connecting the casing to said member, a movable member in said casing, the stationary member being arranged between the support and the movable member, said members each comprising hollow blocks, a pair of parallel spring strips secured to said blocks and supporting the movable member for reciprocatory movement on the stationary member, means on said movable member adapted for operation by a workpiece, a pair of parallel spring reeds one connected to an end block of the stationary member and the other connected to the end block of the movable member, a switch operating arm arranged within the confines of the space defined by said stationary and movable members and secured to both of said spring reeds and operated thereby switch means in said casing operated by said arm, and an electric supply means connected to said support and leading to said switch means.

6. Gauging apparatus comprising a support, a stationary member fixed to said support, a movable member arranged adjacent said stationary member, a pair of parallel spring strips secured to said members and supporting the movable member for reciprocatory movement on the stationary member, means on said movable member adapted for operation by a workpiece, a pair of adjacent parallel spring reeds one connected to the stationary member and the other connected to the movable member, an arm secured to both of said spring reeds and operated thereby, a pair of switches carried by said support and operated by said arm, each switch having a spring supported rigid arm and a flexible arm, a casing enclosing said stationary and movable members, and a pair of adjusting devices carried by the same end wall of the casing directly opposite the support and at one side of said movable member and having projections extending into the casing for contacting and adjusting the rigid arms of said switches individually, said adjusting devices being removable with the casing.

7. Gauging apparatus comprising a support, a stationary member fixed to said support, a movable member arranged adjacent said stationary member, said members each comprising a pair of spaced end blocks and a pair of parallel spaced metal strips interconnecting said blocks, a pair of parallel spring strips secured to said blocks and supporting the movable member for reciprocatory movement on the stationary member, means on said movable member adapted for operation by a workpiece, a pair of parallel spring reeds one connected to an end block of the stationary member and the other connected to the end block of the movable member, an arm secured to both of said spring reeds and operated thereby, a pair of switches operated by said arm and arranged in the space between the spaced metal strips of the movable and stationary members, and a pair of adjusting devices arranged adjacent one another at one side of said movable member and having projections extending between the sheet metal strips of the movable member for adjusting said switches individually.

8. Gauging apparatus comprising a casing having one open side, a support closing the open side of the casing, a stationary member in said casing and fixed to said support, a movable member in said casing arranged adjacent said stationary member, said members each comprising a pair of spaced end blocks and a pair of parallel spaced sheet metal strips integrally connected to said end blocks, a pair of parallel spring strips attached to said members and supporting the movable member for reciprocatory movement, means threaded in an end block of the movable member and projecting through an opening in the casing for operation by a workpiece, a pair of parallel spring reeds secured at one end to the end blocks of the stationary and movable members, an arm connected to the other ends of said spring reeds, a switch at one side of said arm and arranged between the sheet metal strips of the movable member, a second switch at the other side of said arm and arranged between the sheet metal strips of the stationary member, and a pair of adjusting screws threaded in said casing at a point opposite said support and projecting between the sheet metal strips of the movable member for engagement with and adjustment of the respective switches.

9. Gauging apparatus comprising a casing, a support providing a closure for one end of the casing, a stationary member in said casing and fixed to said support, a movable member in said casing arranged adjacent said stationary member, said movable member comprising a pair of spaced end blocks and a pair of parallel spaced sheet metal strips integrally connected to said end blocks, a pair of parallel spring strips attached to said members and supporting the movable member for reciprocatory movement, means on the movable member for operation by a workpiece, a pair of parallel spring reeds secured at one end to the stationary and movable members, an arm connected to and operated by both of said spring reeds, switch means operated by said arm and arranged at one side thereof between the spaced metal strips of the movable member, a second switch at the other side of said arm, and a pair of adjusting screws threaded in said casing at a point opposite said support and projecting in the same direction for engagement with and adjustment of the respective switches.

10. Gauging apparatus comprising a stationary member, a movable member arranged adjacent said stationary member, said movable member comprising a pair of spaced end blocks and a pair of parallel spaced metal strips interconnecting said blocks, a pair of parallel spring strips secured to said members and supporting the movable member for reciprocatory movement on the stationary member, means on said movable member adapted for operation by a workpiece, a pair of parallel spring reeds one connected to the stationary member and the other connected to an end block of the movable member, an arm secured to both of said spring reeds and operated thereby, and an electric switch arranged in the space between the said metal strips of the movable member and operated by said arm.

11. Gauging apparatus comprising a casing having one open side, a support closing the open side of the casing, a stationary member in said casing and fixed to said support, a movable member in said casing arranged adjacent said stationary member, said movable member having a passage therethrough extending towards said support, a pair of parallel spring strips attached to said members and supporting the movable member for reciprocatory movement, means on said movable member and projecting through an opening in said casing for operation by a workpiece, a pair of parallel spring reeds secured at one end to the stationary and movable members, an arm connected to both of said spring reeds, a switch operated by said arm and having a portion arranged in line with said passage, and an adjusting screw threaded in said casing at a point opposite said support and projecting through said passage for engagement with and adjustment of said switch.

12. Gauging apparatus comprising a casing having one open side, a support closing the open side of the casing, a stationary member in said casing and fixed to said support, a movable member in said casing arranged adjacent said stationary member, said movable member having a passage therethrough extending towards said support, a pair of parallel spring strips attached to said members and supporting the movable member for reciprocatory movement, means on said movable member and projecting through an opening in said casing for operation by a workpiece, a pair of parallel spring reeds secured at one end to the stationary and movable members, an arm connected to both of said spring reeds, a pair of switches one at each side of said arm and arranged to be operated by said arm, and a pair of adjusting screws threaded in said casing opposite said passage and projecting through said passage and respectively engageable with said switches at different distances from the fulcrum of said arm, said screws having different thread leads in accordance with their respective distances from the fulcrum of said arm, said casing being removable from said support with said adjusting screws in place on the casing.

WILLIS FAY ALLER.